(12) United States Patent
Hoang

(10) Patent No.: US 10,863,225 B2
(45) Date of Patent: Dec. 8, 2020

(54) PASSENGER VEHICLE ENTERTAINMENT SYSTEM FOR PRESENTING MEDIA DATA FILE FROM A PERSONAL ELECTRONIC DEVICE

(71) Applicant: PANASONIC AVIONICS CORPORATION, Lake Forest, CA (US)

(72) Inventor: Lam Hoang, Ladera Ranch, CA (US)

(73) Assignee: PANASONIC AVIONICS CORPORATION, Lake Forest, CA (US)

(*) Notice: Subject to any disclaimer, the term of this patent is extended or adjusted under 35 U.S.C. 154(b) by 610 days.

(21) Appl. No.: 15/276,585

(22) Filed: Sep. 26, 2016

(65) Prior Publication Data

US 2018/0091843 A1    Mar. 29, 2018

(51) Int. Cl.
| | |
|---|---|
| *H04N 21/414* | (2011.01) |
| *H04N 21/472* | (2011.01) |
| *G06F 3/14* | (2006.01) |
| *H04L 29/08* | (2006.01) |
| *H04N 21/41* | (2011.01) |

(Continued)

(52) U.S. Cl.
CPC ..... *H04N 21/41422* (2013.01); *G06F 3/1454* (2013.01); *H04L 67/06* (2013.01); *H04L 67/12* (2013.01); *H04N 21/4126* (2013.01); *H04N 21/42221* (2013.01); *H04N 21/43615* (2013.01); *H04N 21/472* (2013.01); *G09G 2370/022* (2013.01); *G09G 2370/042* (2013.01); *G09G 2370/16* (2013.01); *G09G 2380/10* (2013.01); *G09G 2380/12* (2013.01)

(58) Field of Classification Search
CPC ......... H04N 21/41422; H04N 21/4126; H04N 21/4221; H04N 21/43615
See application file for complete search history.

(56) References Cited

U.S. PATENT DOCUMENTS

| | | |
|---|---|---|
| 8,106,742 B2 | 1/2012 | Marshall et al. |
| 8,484,284 B2 | 7/2013 | Elliott et al. |
| 9,003,454 B2 | 4/2015 | Keen et al. |

(Continued)

OTHER PUBLICATIONS http://www.airsquirrels.com/slingshothos-screen-sharing-in-tech-support/; printed: Sep. 26, 2016 (4pages).

*Primary Examiner* — Yassin Alata
(74) *Attorney, Agent, or Firm* — Perkins Coie LLP

(57) ABSTRACT

Systems and methods for a passenger vehicle entertainment system configured to access media data files on a passenger's personal electronic device and play the media data files on a video monitor of the entertainment system installed at a passenger seat. The system includes an onboard display system having a computing device, a wireless communication module and a video monitor. The system has a media player software application executable by the computing device and configured to program the display system to establish a wireless network connection to the personal electronic device using the wireless communication module, access media data files stored on the personal electronic device via the wireless network connection, display the media data files on the video monitor and allow a passenger to browse the media data files and select a media data file to play, and play a selected media data file on the video monitor.

14 Claims, 5 Drawing Sheets

(51) Int. Cl.
  *H04N 21/422* (2011.01)
  *H04N 21/436* (2011.01)

(56) References Cited

U.S. PATENT DOCUMENTS

| | | |
|---|---|---|
| 9,060,202 B2 | 6/2015 | Mondragon et al. |
| 9,516,352 B2 | 12/2016 | Keen et al. |
| 2011/0252384 A1 | 10/2011 | Calman et al. |
| 2011/0314490 A1* | 12/2011 | Keen .................. H04N 7/18 725/23 |
| 2014/0094143 A1 | 4/2014 | Ayotte |
| 2014/0237518 A1* | 8/2014 | Liu .................. B60N 2/4876 725/75 |

\* cited by examiner

PASSENGER VEHICLE ENTERTAINMENT SYSTEM FOR PRESENTING MEDIA DATA FILE FROM A PERSONAL ELECTRONIC DEVICE

BACKGROUND

The field of the invention generally relates to entertainment systems for passenger vehicles, and more particularly, to systems and methods for presenting media from a data file stored on a passenger's personal electronic device on a video display of an entertainment system installed on a passenger vehicle.

Typically, entertainment systems for vehicles have video displays installed at each passenger seat, or "shared" video displays at spaced locations throughout the cabin of the vehicle in which each video display is visible from different segments of passenger seats. As used herein the terms "video display" or "video monitor" means a device having a video output device such as an LCD, LED, or other display and an audio output interface for outputting audio such as to a headphone jack. For instance, most commonly, video displays are provided at each passenger seat, such as mounted at each of the seatbacks of the passenger seats, and/or on cabin walls and/or deployable from an armrest for seats located at a bulkhead, i.e., in the first row of a section. Many of these entertainment systems allow each passenger to select from multiple video channels and/or audio channels, or even individually select and play videos from a library of videos. These video displays may also provide access to games, communication applications (e.g., telephone service, messaging, etc.), internet browsing, and other computer applications. Sometimes such displays are referred to as smart monitors due to the ability to provide computer applications and process and store data internally.

Onboard entertainment systems may be installed, and are currently utilized on a variety of vehicles, including commercial passenger aircraft, passenger trains, automobiles, buses. For instance, many commercial passenger aircraft have in-flight entertainment system ("IFE") having video displays located at each passenger seat.

Many of these systems allow each passenger to select from multiple video channels and/or audio channels, or even individually select and play videos and audio programming such as music and podcasts from a library of videos and audio. The entertainment systems may also allow passengers to play computer games, utilize communication applications (e.g., telephone service, messaging, etc.), perform internet browsing, and execute other computer applications. Some entertainment systems utilize video displays referred to as smart monitors having integrated computing capability (e.g., processors, memory, and software) capable of executing computer software applications and processing and storing data internally.

Onboard entertainment systems may be installed, and are currently utilized on, a variety of vehicles, including commercial passenger aircraft, passenger trains, automobiles, buses. For instance, many commercial passenger aircraft have in-flight entertainment system ("IFE") having video displays located at each passenger seat.

In addition, it has become quite commonplace for travelers to carry personal electronic devices having wireless communication capability, such as cellular phones, smart phones, tablet computers, laptop computers, and other portable electronic devices. This includes passengers traveling on all types of transportation including the vehicles of common carriers, such as airplanes, passenger trains, buses, cruise ships, sightseeing vehicles (e.g., ships, boats, buses, cars, etc.). Passengers may store media data files for videos, movies, music, audio programming, and other media on the personal electronic device for playing on the personal electronic device. However, previous onboard entertainments systems for vehicles are not capable of accessing and/or playing media data files stored on a passenger's personal electronic device.

SUMMARY

In one embodiment, the present invention is directed to an innovative onboard entertainment system for a passenger vehicle which can access media data files on a passenger's personal electronic device and play the media from the media data files on a video monitor of the onboard entertainment system installed at a passenger seat. The passenger vehicle may be of any type having a plurality of passenger seats, such as such as an automobile, truck, commercial airplane, train, trolley, bus, ship, ferry, etc. The passenger's personal electronic device may be any suitable electronic computing device having wireless communication capability, such as portable wireless routers/access points (also referred to as "hotspots", such as a MiFi® cellular internet WiFi router manufactured and sold by Novatel Wireless, Inc.), cellular phones, smart phones, tablet computers, laptop computers, and other portable electronic devices. The personal electronic device has media data files for videos, movies, music, audio programming, and other media stored on the personal electronic device.

The entertainment system comprises an onboard display system installed in the passenger vehicle. The onboard display system includes a computing device having a processor, memory and a storage device. The onboard display system also has a wireless communication module operatively coupled to the computing device, such as a wireless adapter utilizing any suitable wireless communication protocol, such as WiFi, Bluetooth, wireless USB, etc. The onboard display system also comprises one or more video monitors operatively coupled to the computing device. As explained above, as used herein, the term "video monitor" means a device having a video output device such as an LCD, LED, or other display and an audio output interface for outputting audio such as to a headphone jack.

The entertainment system also has a media player software application stored on the storage device. The media player software application is executable by the computing device and programs the display system to connect to a passenger's personal electronic device, access media data files on the personal electronic device, and play the media from the media data file on video monitor of the onboard display system. For instance, the media player software application programs the display system to establish a wireless network connection to the passenger's personal electronic device using the wireless communication module. The display system then accesses data file folders having media data files and/or media data files (e.g., MPEG, MPEG-4, Windows Media Video and QUICKTIME™ video data files, or MP3, WAV, MPEG audio data files) stored on the personal electronic device via the wireless network connection. The display system displays the data file folders and media data files on the video monitor and allows a passenger to browse the data file folders and/or media data files and select a media data file to be played. The display system then presents media, such as a movie or music, stored in the selected media data file on the video monitor. As some examples, the display system may play a movie or music stored in the media data file on the video monitor.

In another aspect of the entertainment system, the onboard display system includes a wired network and a wireless access point coupled via an electrical conductor to the wired network. In such case, the wireless network connection is established with the passenger's personal electronic device using the wireless network access point.

In still another feature of the entertainment system, the media player software application is further configured to program the display system to execute a wireless connection function. The wireless connection function displays a wireless connection screen on the video monitor and allows the passenger to enter credentials for the display system to establish the wireless network connection to the passenger's personal electronic device. The display system then uses the credentials to establish the wireless network connection between the display system and the personal electronic device.

In another aspect of the entertainment system, the onboard display system may be an in-seat display system configured to be installed at seats of the passenger vehicles such that the entertainment system comprises a plurality of onboard display systems each installed at a respective seat. Each onboard display system includes a computing device having a processor, memory, and a storage device, a wireless communication module and a video monitor operatively coupled to the computing device, and the media player software application is stored on the respective storage device of each onboard display system. Thus, each display system is programmed to establish a wireless network connection to the passenger's personal electronic device, access data file folders having media data files and/or media data files stored on the personal electronic device, display the data file folders and media data files on the respective video monitor and allow a passenger to browse the data file folders and/or media data files and select a media data file using the video monitor, and present the media from a respective selected media data file on the respective video monitor.

In another aspect of the entertainment system, the onboard display system may be configured with a central onboard management system containing the computing device and wireless communication module. The central onboard management system is operatively connected to a plurality of video monitors, with each video monitor installed at a respective passenger seat. The central onboard management system is configured to present media from the selected media data file on one or more selected video monitors.

In another aspect, the entertainment system may be configured to allow multiple passengers to access and play media data files from the single personal electronic device. In this case, the media play software application is further configured to display the data file folders and media data files from the personal electronic device on the another video monitor. The media play software application allow another passenger to browse the data file folders and/or media data files and select another media data file, and present the media from the another media data file on the other passenger's video monitor.

Another embodiment of the present invention is directed to methods for presenting media from a data file stored on a passenger's personal electronic device on a video display installed at a respective passenger seat on a passenger vehicle. In one embodiment, the method comprises providing an onboard display system in a passenger vehicle, the onboard display system including a computing device having a processor, memory and a storage device, a wireless communication module operatively coupled to the computing device, a video monitor operatively coupled to the computing device, and a media player software application stored on the storage device. Then, a wireless connection is established between the onboard display system and a passenger's personal electronic device. The onboard display system accesses data file folders having media data files and/or media data files stored on the personal electronic device via the wireless network connection with the onboard display system. The onboard display system displays the data file folders and media data files on the video monitor and allowing a passenger to browse the data file folders and/or media data files and select a media data file. The onboard display system receives a selection of a media data file stored on the personal electronic device. Then, the onboard display system presents media from the selected media data file on the video monitor.

In additional aspects of the method embodiment, the method may also include any of the additional aspects described herein for the entertainment system for presenting media from a data file stored on a passenger's system on a video monitor of the entertainment system installed on a vehicle.

Furthermore, although the embodiments described above are applied to connecting a single personal electronic device to an onboard display system, the systems and methods may be configured to perform the same functionality to connect a plurality of personal electronic devices to one or more onboard display systems.

BRIEF DESCRIPTION OF THE DRAWINGS

The foregoing and other aspects of embodiments are described in further detail with reference to the accompanying drawings, wherein like reference numerals refer to like elements and the description for like elements shall be applicable for all described embodiments wherever relevant, wherein.

DETAILED DESCRIPTION

Figure 1:
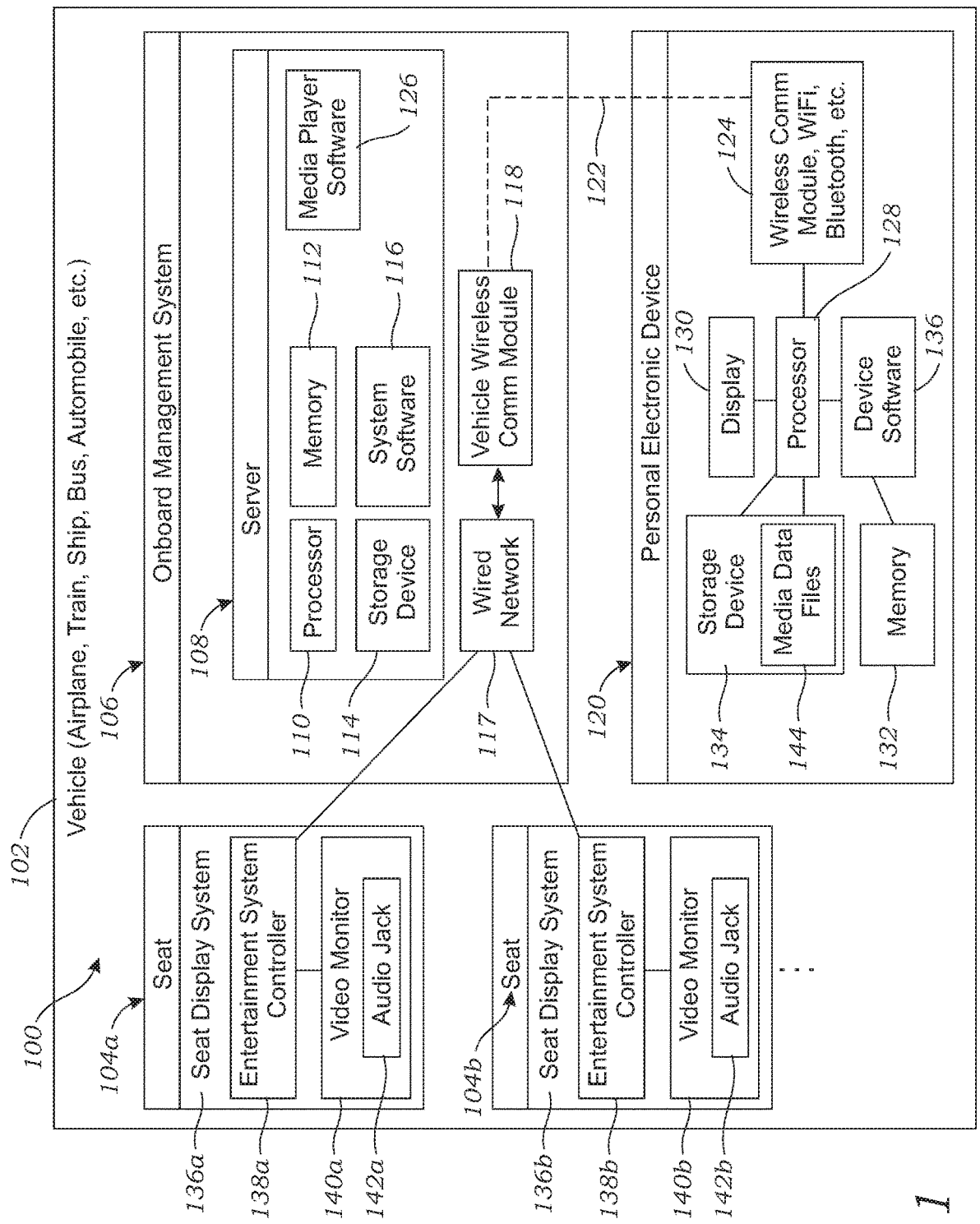
FIG. 1 is a block schematic diagram of an entertainment system for installation on a passenger vehicle which can access media data files on a passenger's personal electronic device and play the media from the media data files on a video monitor of the entertainment system installed at a passenger seat, according to one embodiment of the present invention.

The present invention is directed to systems and methods for a passenger vehicle entertainment system for accessing media data files on a passenger's personal electronic device and playing the media from the media data files on a video monitor of the entertainment system installed at a passenger seat. Referring to FIG. 1, a schematic diagram of one embodiment of an entertainment system 100 installed in a passenger vehicle 102. The passenger vehicle 102 may be any type of passenger vehicle 102, such as an airplane, train, ship, bus, automobile, etc. having one or more passenger seats 104. Passenger seat pairing system 100 is shown. The system 100 comprises an onboard management system 106 which is configured to be installed in the vehicle 102. The onboard management system 102 is a computer system for operating various functions of the entertainment system 100 on the vehicle 102. For example, the onboard management system 102 is configured to perform audio/video entertainment functions, and may also include an onboard internet service system, and/or other onboard electronic functions.

The onboard management system 106 comprises a server 108 which may simply be a computer or information processing device to serve the request of other programs and/or computing devices (i.e., a client). The server 108 comprises one or more computer processors 110, memory 112, one or more storage devices 114 for electronically storing digital files, such as a hard drive or solid-state drive (SSD), and system software 116 for programming the server 108 to perform the functions of the onboard management system 106, as described in more detail herein.

The onboard management system 106 also comprises a wired network 117 for providing network communications between various components of the entertainment system 100, such as between the onboard management system 106 and a plurality of seat display systems 136. A vehicle wireless communication module 118 is networked to the wired network 117 and is also in operable communication with the server 108, such that server 108 may communicate wirelessly with other devices, such as a personal electronic device 120 of a passenger. The personal electronic device 120 is any suitable, portable electronic computing device having wireless communication capability, as described in more detail below. The vehicle wireless communication module 118 may be any suitable wireless communication module, such as a wireless access point, Wi-Fi module, an NFC module, a Bluetooth module, a cellular base module, or other suitable wireless communication transceiver system. Typically, the vehicle wireless communication module 118 is a Wi-Fi module because many personal electronic devices 120 have a Wi-Fi communication module for connecting to a Wi-Fi network.

Alternatively, the vehicle wireless communication module 118 may comprise a plurality of wireless communication modules, such as a plurality of Wi-Fi modules, NFC modules or Bluetooth modules distributed throughout the vehicle 102. For instance, an NFC module may be provided at each passenger seat 104 within the vehicle 102, or several Wi-Fi or Bluetooth modules may be spaced about the vehicle 102 to provide adequate signal strength to communicate with personal electronic devices 120 located throughout the vehicle 102. Aircraft frequently include one or more wireless access points (WAPs). The plurality of vehicle wireless communication modules 118 are each in operable communication with the server 108, such as through a local area network or other suitable network.

The vehicle wireless communication module 118 is configured to establish a wireless network connection 122 with the personal electronic device 120, such as a link with a wireless communication module 124 of the personal electronic device 120. The wireless communication module 124 is of the same type and operates on a compatible communication protocol/standard as the vehicle wireless communication module 118, such as Wi-Fi, Bluetooth, NFC, etc.

The system software 116 of the onboard management system 106 also includes a media player software module 126 which programs the onboard management system 106 to access and play media files from the personal electronic device 120. The media player software module 126 includes a wireless connection function, wireless connection session function, media data file selection function, playlist function and media player function, for programming the entertainment system 100 to perform these functions, as described herein.

The personal electronic device 120 may be any suitable, portable electronic computing device having wireless communication capability, such as a portable wireless routers/access points (also referred to as "hotspots", such as a MiFi® cellular internet WiFi router manufactured and sold by Novatel Wireless, Inc.), cellular phone, smart phone, tablet computer, laptop computer, or other portable electronic device. As shown in FIG. 1, the personal electronic device 120 includes a processor 128, a display 130 (e.g., an LCD, LED or other display), memory 132, a storage device 134, and device software 136. The storage device 134 stores one or more media data files 144 which can be presented (e.g., decoded and processed for display) on the display 130 and/or an external video monitor.

Figure 2:
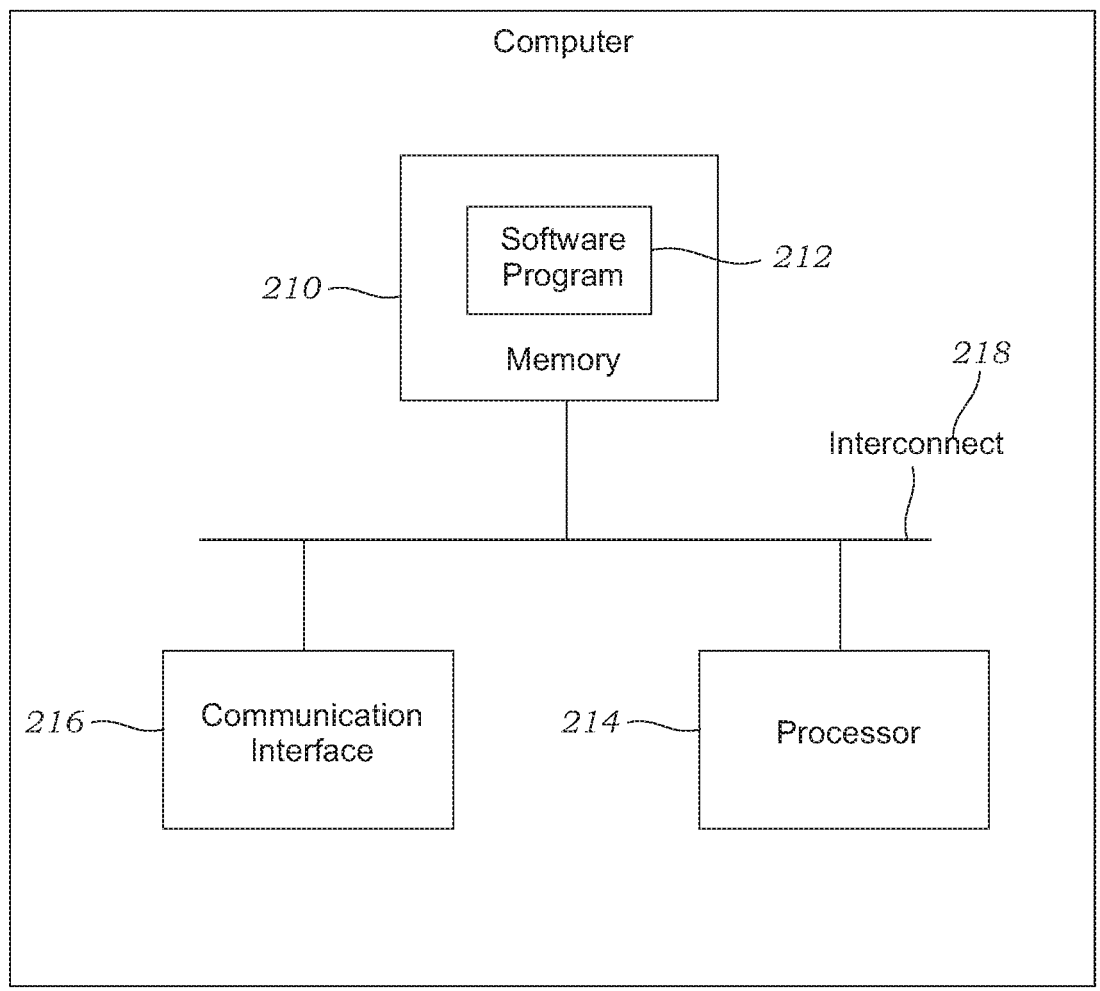
FIG. 2 is a block diagram of a computing device (computer) which may be utilized in the entertainment system and/or the personal electronic device of FIG. 1 or FIG. 4.
Figure 3:
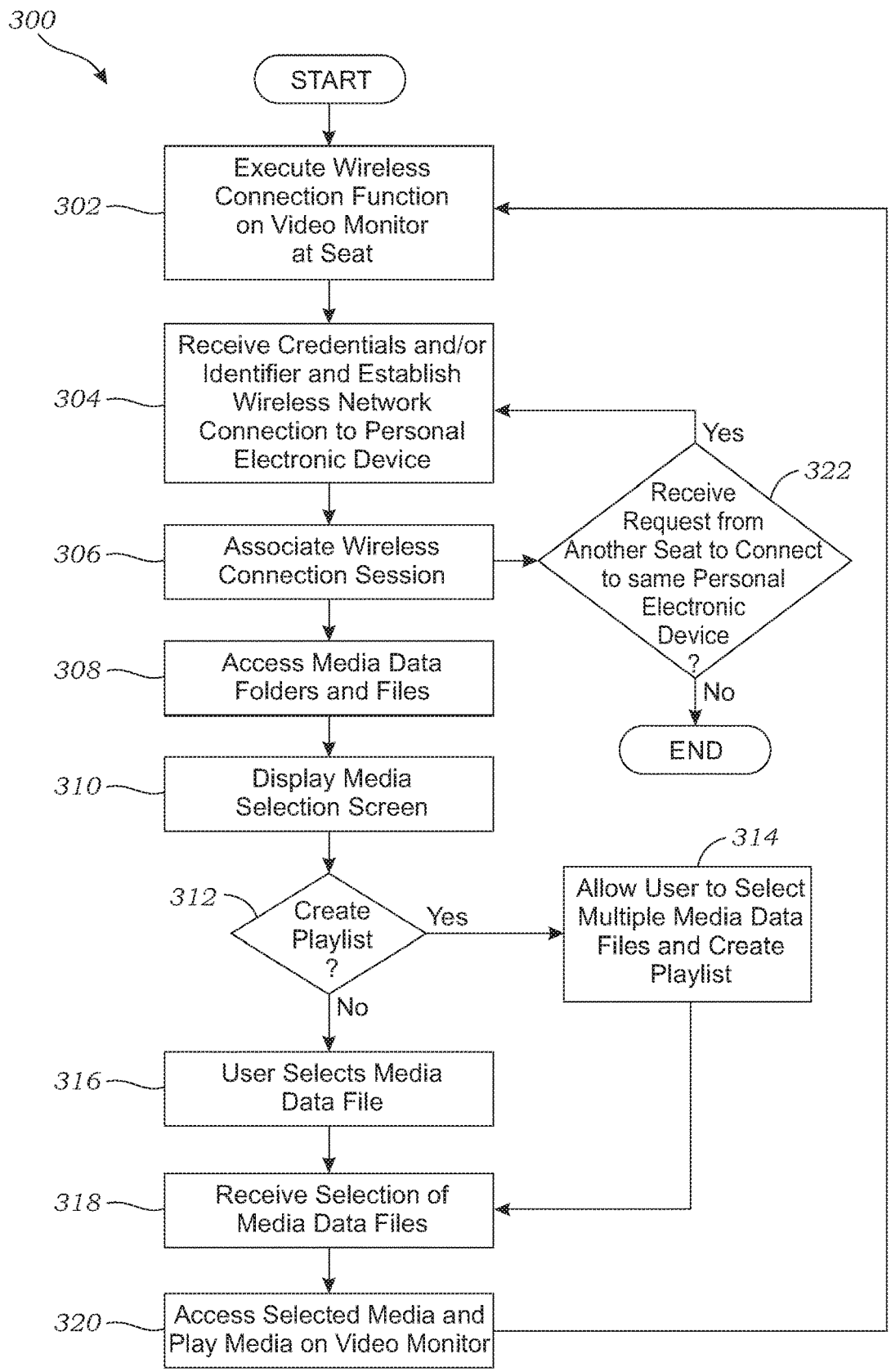
FIG. 3 illustrates an exemplary flow chart of a method for accessing and presenting media from a data file stored on a passenger's personal electronic device using the entertainment system of FIG. 1, according to one embodiment of the present invention.
Figure 4:
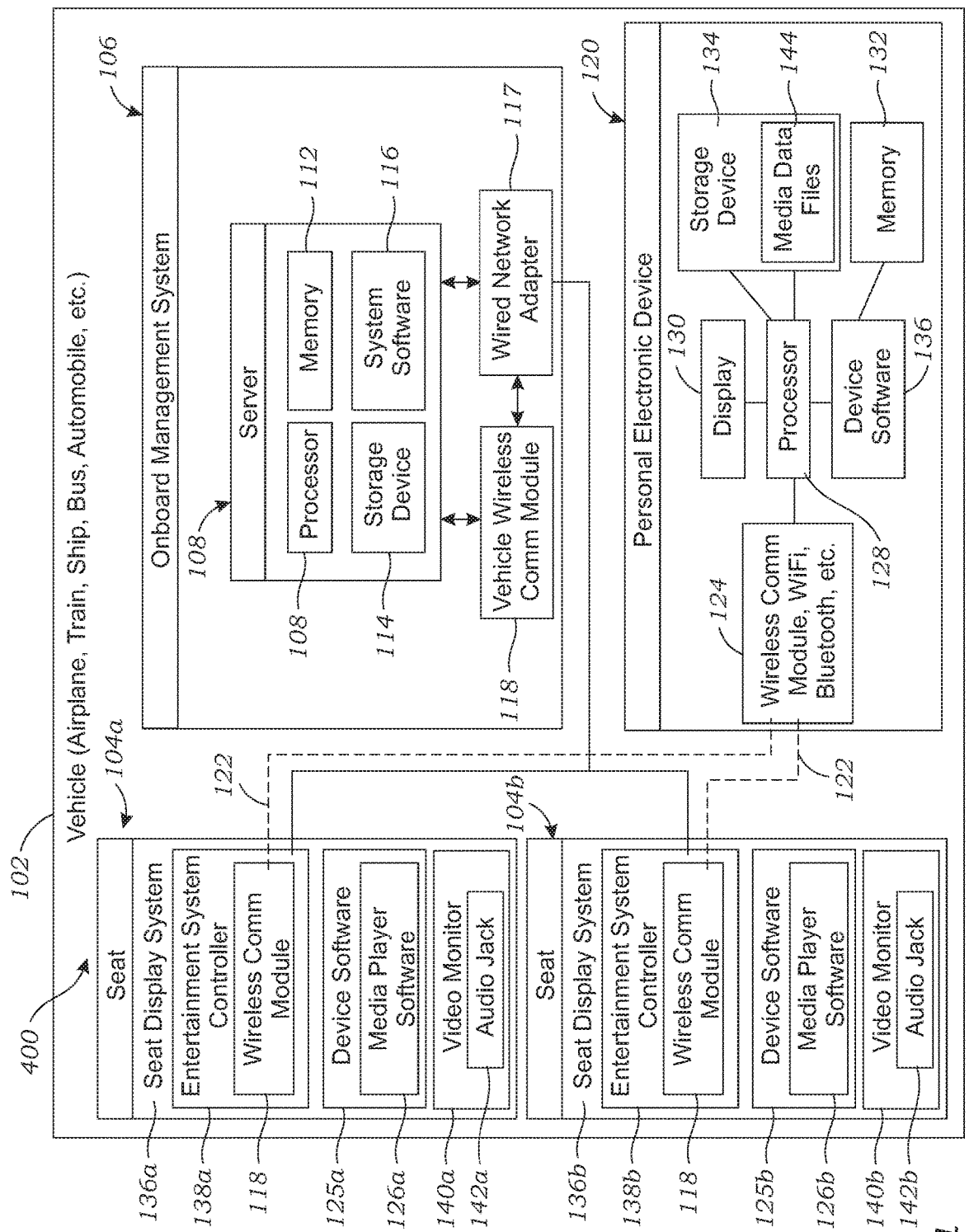
FIG. 4 is a block schematic diagram of another entertainment system for installation on a passenger vehicle which can access media data files on a passenger's personal electronic device and play the media from the media data files on a video monitor of the entertainment system installed at a passenger seat, according to one embodiment of the present invention.

FIG. 2 generally shows a block diagram of the components of an example of a computer (computing device) 200 that may be used as the computer in the personal electronic device 120 and server 108 in the entertainment systems 100 and 400 of FIGS. 1 and 4, respectively. The computer 200 includes memory 210, an application software program 212, a processor or controller 214 to execute the application software 212, a network or communications interface 216, e.g., for communications with a network or interconnect 218 between the components. The memory 210 may be or include one or more of cache, RAM, ROM, SRAM, DRAM, RDRAM, EEPROM, SDRAM and other types of volatile or non-volatile memory capable of storing data. The processor unit 214 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 218 may include a system bus, LDT, PCI, ISA, or other types of buses, and the communications or network interface may, for example, be an Ethernet interface, a Frame Relay interface, or other interface. The network interface 216 may be configured to enable a system component to communicate with other system components across a network which may be a wireless network or various other communication networks. It should be noted that one or more components of computer 200 may be located remotely and accessed via a network. Accordingly, the system configuration provided in FIG. 2 is provided to generally illustrate how embodiments may be configured and implemented.

The onboard management system 106 is operably coupled electronically (e.g., using a wired and/or wireless communication network) to each of the seat display systems 136 installed at each seat 104. Each seat display system 136 comprises an entertainment system controller 138. The entertainment system controller 138 is operably coupled to a video monitor 140 having a video display (e.g., an LCD, LED or other suitable display) including an audio jack 142 configured to output audio. The entertainment system controller 138 is configured to communicate with the onboard management system 106 and to control the operation of the video monitor 140, such as playing audio/video media content on the video monitor 140. The entertainment system controller 138 may be integrated with the video monitor 140, such as in a smart monitor having a computing device, data storage, a network communication adapter (e.g., a wireless communication module or wired networking module) and software applications which enable the smart monitor to establish a network connection to other devices, and to play audio/video media and/or run other software applications such as a game, internet browser, texting applications, or other applications.

The entertainment system 100 is configured to execute the system software 116 which programs the entertainment system to 100 establish a wireless network connection between the onboard management system 106 and the personal electronic device 120, and then access and play media from a media data file 144 stored on the personal electronic device 120. For example, the flow chart of FIG. 2 illustrates an algorithm for a process 300 for performing such a method. At step 302, the onboard management system 106 executes a wireless connection function which is part of the system software 116 and/or media player software module 126 to for establishing a wireless network connection between the onboard management system 106 and the personal electronic device 120. For example, the wireless connection function displays a wireless connection screen on the video monitor 134 located at seat 104a. When the wireless communication function of the personal electronic device 120 is enabled and broadcasting, the onboard management system 106 may automatically detect the personal electronic device 120 as an available wireless network. The wireless connection screen allows a passenger at seat 104a to authorize a wireless connection between the onboard management system 106, such as by selecting a confirmation to allow the connection using an input device of the entertainment system controller 138. Establishing a wireless network connection to the personal electronic device 120 may require security credentials, such as in a secured WiFi network. In such case, the wireless connection screen requests the required credentials, such as a password and/or username. The passenger then enters the password and/or username on the wireless connection screen. In some cases, the personal electronic device 120 may not be broadcasting its identification (e.g., an "SSID" for a WiFi network), which case, the wireless connection screen also requests the identifier for the wireless network and the user enters the identification on the wireless connection screen. At step 304, the onboard management system 106 receives the credentials and/or identifier, and establishes a wireless network connection between the onboard management system 106 and the personal electronic device 120.

At step 306, the onboard management system 106 associates the wireless connection session between the personal electronic device 120 and the particular seat, for example seat 104a and/or video monitor 140a at which the wireless connection was enabled using the wireless connection screen, i.e. seat 104a. The association may be accomplished by generating a wireless connection session record stored on the onboard management system 106, or other suitable manner. The wireless connection session allows the onboard management system 106 to play a media data file from the associated portable electronic device 120 on the respective video monitor 140a at seat 104a.

At step 308, the onboard management system 106 accesses media data file folders having media data files 144 therein and/or media data files 144 stored on the storage device 134 via the wireless network connection. At step 310, the onboard management system 106 displays a media selection screen on the video monitor 134. The media selection screen displays the data file folders and/or media data files 144 and also allows the passenger to browse the data file folders and media data files 144 and select a media data file to play. At steps 312 and 314, the media selection screen may also enable the user to select a plurality of media data files 144 to play, and also to arrange them in a playlist. For instance, the media selection screen may have a graphical user interface which allows a user to select multiple media data files and then to graphically arrange them in a desired order to create a playlist. If no playlist is being created, then at step 316, the user selects a media data file using the media selection screen.

At step 318, the onboard management system 106 receives a selection of the media data file 144 to be played. At step 320, the onboard management system 106 accesses the selected media data file 144 from the personal electronic device 120, associates the media data file with a suitable media player for playing the type of media data file (e.g., WINDOWS MEDIA PLAYER™, QUICKTIME™, or other decoder/media player) and plays media from the media data file 144 using the media player on the video monitor 140 located at seat 104a, i.e., the video monitor associated with the specific wireless connection session generated at step 304. If a playlist has been created, then the onboard management system 106 successively accesses and plays each of the media data files 144 in the playlist on the video monitor 140.

In another aspect of the method 300, the entertainment system 100 performs a process to allow multiple passengers at different seats 104 (e.g., seat 104a and seat 104b) having different video monitors 140 (e.g., video monitor 140a and video monitor 140b) and entertainment system controllers 138 to access and play the media data files on the same personal electronic device 120. At step 322, the onboard management system 106 receives a request from another seat, such as seat 104b, to connect to the same personal electronic device 120. For instance, the onboard management system 106 executes the wireless connection function to display the wireless connection screen on the video monitor 140b at seat 104b. The passenger at seat 104b then utilizes the wireless connection screen to establish a wireless network connection to between the onboard management system 106 and the personal electronic device 120. If a wireless network connection between the onboard management system 106 and the personal electronic device 120, then the onboard management system 106 does not need to establish another wireless network connection. If a wireless network connection between the onboard management system 106 and the personal electronic device 120, then the onboard management system 106 does not need to establish another wireless network connection. In such case, the onboard management system 106 may display a notification to the passenger that the personal electronic device 120 is already connected to another seat display system, and ask the passenger if the want to access the same personal electronic device. In another feature, the onboard management system 106 may prompt the seat display system at seat 104*a* to display a request to share the personal electronic device 120 with the seat display system 136*b* at seat 104*b*. If the passenger at seat 104*a* accepts the request, then the seat display system 136*a* at seat 104*a* sends a message to the onboard management system 106 that the request is accepted and the onboard management system 106 provides access to the personal electronic device 120 to the seat display system 136*b* at seat 104*b*.

However, if the previous wireless network connection has been disconnected from some reason, then the onboard management system 106 establishes a wireless network connection between the onboard management system 106 and the personal electronic device 120.

Under each of the previous situations in which the seat display system 136 at seat 104*b* is given access to the personal electronic device 120, the onboard management system 106 then associates another wireless connection session between the personal electronic device 120 and seat 104*b* and/or video monitor 140*b* at seat 104*b*. Then, the entertainment system 100 performs steps 308-320 for seat 104*b*, as described above. This process may be repeated for any number of passengers at different seats 104 having different video monitors 140 and entertainment system controllers 138.

In still another aspect, the entertainment system 100 may also establish a wireless network connection to a plurality of personal electronic devices 120 and perform the method 300 for each of the personal electronic devices 120. For instance, the onboard management system 106 may establish a first wireless network connection for one or more first wireless connection sessions associating one or more first video monitors 140 with a first personal electronic device 120, such that the first video monitors 140 can play media from media data files 134 on the first personal electronic device 120. At the same time, the onboard management system 106 may establish a second wireless network connection for one or more second wireless connection sessions associating one or more second video monitors 140 with a second personal electronic device 120, such that the second video monitors 140 can play media from media data files 134 on the second personal electronic device. The same can be done for any number of additional wireless network connections and personal electronic devices 120.

Turning now to FIG. 4, another embodiment of a passenger vehicle entertainment system 400 for accessing media data files on a passenger's personal electronic device and playing the media from the media data files on a video monitor of the entertainment system 400 installed at a passenger seat is illustrated. The system 400 has many of the same components as the system 100 described above, wherein like reference numerals refer to like elements such that the description for like elements in the system 100 shall be applicable for the system 400 wherever relevant. The system 400 is similar to the system 100, except that instead of utilizing the onboard management system as a centralized server to connect to the personal electronic device 120, each of the seat display systems is configured to connect the personal electronic device 120 and to access and play media data files from the personal electronic device 120 on the video monitor of the respective seat display systems.

Accordingly, as shown in FIG. 4, each of the seat display systems 136 includes a wireless communication module 118. The wireless communication module 118 may be integrated with the entertainment system controller 138, or it may be a separate device operably coupled to the entertainment system controller 138. Each of the seat display systems 136 also includes device software 125 and a media player software module 126 which programs the seat display system 136 to access and play media files from the personal electronic device 120. As in the media player software module 126 of the entertainment system 100, the media player software module 126 for the entertainment system 400 includes a wireless connection function, wireless connection session function, media data file selection function, playlist function and media player function, for programming the entertainment system 400 to perform these functions, as described herein.

Figure 5:
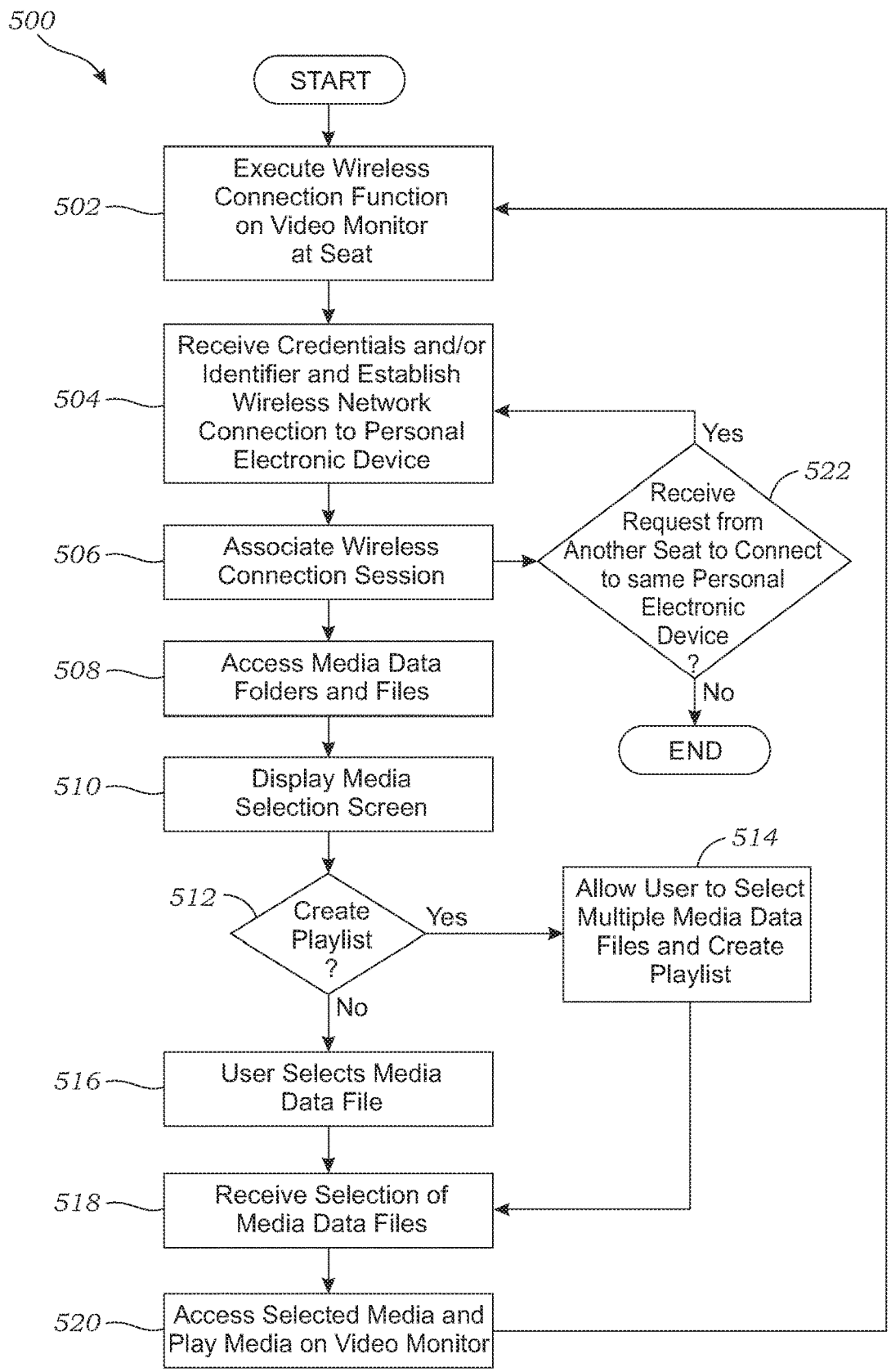
FIG. 5 illustrates an exemplary flow chart of a method for accessing and presenting media from a data file stored on a passenger's personal electronic device using the entertainment system of FIG. 4, according to one embodiment of the present invention.

The entertainment system 400 is configured to execute the system software 116 and the media player software module 126 which programs the entertainment system 400 to establish a wireless network connection between a seat display system 136 and the personal electronic device 120, and then access and play media from a media data file 144 stored on the personal electronic device 120. For example, the flow chart of FIG. 5 illustrates an algorithm for a process 500 for performing such a method. At step 502, a seat display system 136, such as seat display system 136*a* executes the wireless connection function which may be part of the device software 125 of the seat display system 136 and/or the media player software module 126 to establish a wireless network connection between the seat display system 136 and the personal electronic device 120. The wireless connection function displays a wireless connection screen on the video monitor 134 located at seat 104*a*. The process of step 502 for establishing a wireless network connection 122 between the seat display system 136 and the personal electronic device 120 is the same as step 302 for establishing a wireless network connection between the onboard management system 106 and the personal electronic device 120, except that the connection is to the seat display system 136 instead of the onboard management system 106.

At step 504, the seat display system 136 receives the credentials and/or identifier, and establishes a wireless network connection between the seat display system 136 and the personal electronic device 120.

At step 506, the seat display system 136 associates the wireless connection session between the personal electronic device 120 and the particular seat, for example seat 104*a* and/or video monitor 140 at which the wireless connection was enabled using the wireless connection screen, i.e., seat 104*a*. The association may be accomplished by generating a wireless connection session record stored on the seat display system 136, or other suitable manner. The wireless connection session allows the seat display system 136 to play a media data file from the associated portable electronic device 120 on the respective video monitor 140 at seat 104*a*.

At step 508, the seat display system 136 accesses media data file folders having media data files 144 therein and/or media data files 144 stored on the storage device 134 via the wireless network connection. At step 510, the seat display system 136 displays a media selection screen on the video monitor 134. The media selection screen displays the data file folders and/or media data files 144 and also allows the passenger to browse the data file folders and media data files 144 and select a media data file to play. At steps 512 and 514, the media selection screen may also enable the user to select a plurality of media data files 144 to play, and also to arrange them in a playlist. For instance, the media selection screen may have a graphical user interface which allows a user to select multiple media data files and then to graphically arrange them in a desired order to create a playlist. If no playlist is being created, then at step 516, the user selects a media data file using the media selection screen.

At step 518, the seat display system 136 receives a selection of the media data file 144 to be played. At step 520, the seat display system 136 accesses the selected media data file 144 from the personal electronic device 120, associates the media data file with a suitable media player for playing the type of media data file (e.g., WINDOWS MEDIA PLAYER™ QUICKTIME™, or other decoder/media player) and plays media from the media data file 144 using the media player on the video monitor 140 located at seat 104a, i.e., the video monitor associated with the specific wireless connection session generated at step 504. If a playlist has been created, then the seat display system 136 successively accesses and plays each of the media data files 144 in the playlist on the video monitor 140.

In another aspect of the method 500, the entertainment system 400 performs a process to allow multiple passengers at different seats 104 having different video monitors 140 and entertainment system controllers 138 to access and play the media data files on the same personal electronic device 120. At step 522, the seat display system 136 receives a request from another seat, such as seat 104b, to connect to the same personal electronic device 120. For instance, the seat display system 136 executes the wireless connection function to display the wireless connection screen on the video monitor 140 at seat 104b. The passenger at seat 104b then utilizes the wireless connection screen to establish a wireless network connection between the seat display system 136 and the personal electronic device. If a wireless network connection between the onboard management system 106 and the personal electronic device 120, then the seat display system 136 does not need to establish another wireless network connection. In such case, the seat display system 136 may display a notification to the passenger that the personal electronic device 120 is already connected to another seat display system, and ask the passenger if the want to access the same personal electronic device. In another feature, the seat display system 136 at seat 104b may prompt the seat display system at seat 104a to display a request to share the personal electronic device 120 with the seat display system 136 at seat 104b. If the passenger at seat 104a accepts the request, then the seat display system at seat 104a sends a message that the request is accepted and provides access to the personal electronic device 120 to the seat display system 136 at seat 104b.

However, if the previous wireless network connection has been disconnected from some reason, then the seat display system 136 at seat 104b establishes a wireless network connection between the onboard management system 106 and the personal electronic device 120.

Under each of the previous situations in which the seat display system 136 at seat 104b is given access to the personal electronic device 120, the seat display system 136 then repeats step 506 to associate another wireless connection session between the personal electronic device 120 and seat 104b and/or video monitor 140 at seat 104b. Then, the entertainment system 400 performs steps 508-520 for seat 104b, as described above. This process may be repeated for any number of passengers at different seats 104 having different video monitors 140 and entertainment system controllers 138.

Of course, the entertainment system 400 may also establish a wireless network connection between a plurality of seat display systems 136 and a plurality of respective personal electronic devices 120 and perform the method 500 for each associated seat display system 136 and personal electronic device 120. For instance, one or more seat display systems 136 may each establish a wireless network connection with a first personal electronic device 120, such that the respective video monitors 140 can play media from media data files 134 on the first personal electronic device 120. At the same time, one or more other seat display systems 136 may each establish a wireless network connection with a second personal electronic device 120 such that the respective video monitors 140 can play media from media data files 134 on the second personal electronic device. The same can be done for any number of seat display systems 136 and personal electronic devices 120.

Although particular embodiments have been shown and described, it is to be understood that the above description is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims. For example, not all of the components described in the embodiments are necessary, and the invention may include any suitable combinations of the described components, and the general shapes and relative sizes of the components of the invention may be modified. Accordingly, embodiments are intended to exemplify alternatives, modifications, and equivalents that may fall within the scope of the claims. The invention, therefore, should not be limited, except to the following claims, and their equivalents.

What is claimed is:

1. An entertainment system for a passenger vehicle having seats configured to present media from a media data file stored on a passenger's personal electronic device on a video monitor of the entertainment system installed at one of the seats, the entertainment system comprising:
  an onboard display system installed in the passenger vehicle, the onboard display system including a computing device having a processor, memory and a storage device, a wireless communication module operatively coupled to the computing device, and a video monitor operatively coupled to the comminuting device;
  a media player software application stored on the storage device and configured to program the display system to establish a wireless network connection to a passenger's personal electronic device using the wireless communication module, access data file folders having media data files and/or media data files stored on the personal electronic device via the wireless network connection, display the data file folders and media data files on the video monitor and allow a passenger to browse the data file folders and/or media data files and select a media data file, and play the selected media data file using a media player software program stored on the storage device to present media from the selected media data file on the video monitor,
  wherein the onboard display system comprises a plurality of video monitors each installed at a respective seat of the passenger vehicle, and the media player software application is further configured to program the display system to execute a wireless connection function which displays a wireless connection screen on the video monitor and allows the passenger to enter credentials for the display system to establish the wireless network connection to the passenger's personal electronic device, and upon receiving the credentials, the display system uses the credentials to establish the wireless network connection and associate the personal electronic device to a particular video monitor among the plurality of video monitors.

2. The entertainment system of claim 1, wherein the media player software application is further configured to program the display system to associate the first media data file with the media player software program for playing the first media data file.

3. The entertainment system of claim 1, wherein the personal electronic device is selected from the group consisting of a wireless access point, a cellular phone configured to function as a wireless access point, a cellular hotspot device, a tablet computer configured to function as a wireless access point, and a personal computer configured to function as a wireless access point.

4. The entertainment system of claim 1, wherein the passenger vehicle is a commercial airplane and the onboard display system is an in-flight entertainment system.

5. An entertainment system for a vehicle having seats for passengers configured to present media from a data file stored on a passenger's personal electronic device, the system comprising:
a plurality of video monitors, each video monitor installed at a respective seat;
a central onboard management system comprising a computing device having a processor, memory and a storage device, and a wireless communication module, the central onboard managements system operatively connected to each of the video monitors and configured to present media on each of the video monitors;
a software application stored on the storage device and configured to program the central onboard management system to establish a wireless network connection to a passenger's personal electronic device, associating the wireless connection session with a video monitor located at a seat for a passenger, access data file folders having data files and/or data files stored on the personal electronic device via the wireless network connection, display the data file folders and data files on the video monitor and allow the passenger to browse the data file folders and/or data files and select a data file, and open the data file using a media software application stored on the storage device to display media from the selected data file on the video monitor.

6. The entertainment system of claim 5, wherein the software application is further configured to program the central onboard management system to: execute a wireless connection function which displays a wireless connection screen on the video monitor and allows the passenger to enter credentials for the central onboard management system to establish the wireless network connection to the passenger's personal electronic device; upon receiving the credentials, to use the credentials to establish the wireless network connection; and wherein associating the wireless connection session with the video monitor located at the seat for the passenger is based on the video monitor at which the credentials were entered.

7. The entertainment system of claim 5, wherein the software application is further configured to associate media data files with a media player software program for playing media data files.

8. The entertainment system of claim 7, wherein the software application is further configured to allow a user to create a playlist of media data files stored on the personal electronic device.

9. The entertainment system of claim 5, wherein the personal electronic device is selected from the group consisting of a wireless access point, a cellular phone configured to function as a wireless access point, a cellular hotspot device, a tablet computer configured to function as a wireless access point, and a personal computer configured to function as a wireless access point.

10. The entertainment system of claim 5, wherein the software application is further configured to associate the wireless connection session with another video monitor located at another seat for another passenger, access data file folders having data files and/or data files stored on the personal electronic device, display the data file folders and data files on the another video monitor and allow the another passenger to browse the data file folders and/or data files and select a data file, and display information from the selected data file on the another video monitor.

11. The entertainment system of claim 10, wherein the selected data file by the passenger and the another passenger is one of the same selected data file or a different data file.

12. A method for presenting media from a data file stored on a passenger's personal electronic device on a video display installed at respective passenger seat on a passenger vehicle, the method comprising;
providing an onboard display system in a passenger vehicle, the onboard display system including a computing device having processor, memory and a storage device, a wireless communication module operatively coupled to the computing device, a video monitor operatively coupled to the computing device, and a media player software application stored on the storage device;
establishing a wireless connection between the onboard display system and a passenger's personal electronic device;
accessing data file folders having media data files and/or media data files stored on the personal electronic device via the wireless network connection with the onboard display system;
displaying the data file folders and media data files on the video monitor and allowing a passenger to browse the data file folders and/or media data files and select a media data file;
receiving by the onboard display system a selection of a media data file stored on the personal electronic device; and
playing the selected media data file using a media player software program stored on the storage device and presenting media from the selected media data file on the video monitor,
further comprising:
executing a wireless connection function which displays a wireless connection screen on the video monitor and allows the passenger to enter credentials for the onboard display system to establish the wireless network connection to the passenger's personal electronic device; receiving by the onboard display system the credentials; and
after receiving the credentials, causing the onboard display system to use the credentials to establish the wireless network connection and associate the personal electronic device to the video monitor among a plurality of video monitors.

13. The method of claim 12, wherein the personal electronic device is selected from the group consisting of a wireless access point, a cellular phone configured to function as a wireless access point, a cellular hotspot device, a tablet computer configured to function as a wireless access point, and a personal computer configured to function as a wireless access point.

14. The method of claim 12, wherein the passenger vehicle is a commercial airplane and the onboard display system is an in-flight entertainment system.

* * * * *